455-601 AU 233 EX
FIP8106 XR 3,614,447

XS-002T
XS006Y

United Stat XS00TH

[11] 3,614,447

[72] Inventors Thomas L. Paoli
Chatham;
Jose E. Ripper, North Plainfield, both of N.J.
[21] Appl. No. 833,522
[22] Filed June 16, 1969
[45] Patented Oct. 19, 1971
[73] Assignee Bell Telephone Laboratories, Incorporated
Murray Hill, N.J.

[54] METHOD FOR MODULATING SEMICONDUCTOR LASERS
7 Claims, 2 Drawing Figs.

[52] U.S. Cl. 250/199, 317/234, 331/94.5
[51] Int. Cl. H01s 3/18
[50] Field of Search 250/199, 217 SS; 331/94.5; 317/235 (27); 332/7.51; 313/108 D

[56] References Cited
UNITED STATES PATENTS

| | | | |
|---|---|---|---|
| 3,258,596 | 6/1966 | Green | 250/199 |
| 3,459,942 | 8/1969 | Anderson | 250/199 |
| 3,478,280 | 11/1969 | Fenner | 332/7.51 |
| 3,483,383 | 12/1969 | Konnerth | 250/199 |

*Primary Examiner*—Ronald L. Wibert
*Assistant Examiner*—Edward S. Bauer
*Attorneys*—R. J. Guenther and Arthur J. Torsiglieri

ABSTRACT: A semiconductor junction laser is modulated by applying a suitable DC voltage to produce self-induced pulsing, phase locking the pulsing repetition rate to a low-power microwave signal, and modulating the microwave signal. Information carrying capacities in excess of 10 megahertz are obtained with microwave power of a few milliwatts. Multiplexing arrangements are also described.

INVENTORS T. L. PAOLI
J. E. RIPPER

ATTORNEY

METHOD FOR MODULATING SEMICONDUCTOR LASERS

BACKGROUND OF THE INVENTION

It has been observed by the inventors that continuously operating semiconductor junction lasers, at suitable values of temperature and current, exhibit a self-induced pulsing effect, that is they produce a sequence of light pulses, at microwave rates. (See T. L. Paoli and J. E. Ripper, "Coupled Longitudinal Mode Pulsing in Semiconductor Lasers," Phys. Rev. Letters, May 26, 1969.)

In first concurrently filed application Ser. No. 833,365, entitled "Method for Narrowing the Pulse Width in Semiconductor Lasers Exhibiting Self-Induced Pulsing," they disclose a method for narrowing the pulse width of lasers exhibiting self-induced pulsing, and in a second concurrently filed application Ser. No. 833,366, "Method for Pulse-Width Modulating Semiconductor Lasers," they disclose a method for pulse-width modulating such lasers.

The present invention is directed toward a method for modulating the position of pulses in the output of pulsing semiconductor lasers.

BRIEF SUMMARY OF THE INVENTION

It has been discovered, in accordance with the present invention, that the light pulses emitted by a spontaneously pulsing semiconductor laser can be position modulated by locking them in phase with a low-power microwave frequency signal and then frequency modulating the microwave signal. As the frequency of the microwave signal changes, the repetition rate of the laser follows. Thus, the repetition rate varies directly as the frequency of the applied signal. Since the laser is spontaneously pulsing, the microwave signal need not produce the pulses and can produce modulation with relatively low levels of microwave power.

BRIEF DESCRIPTION OF THE DRAWINGS

The nature, features and advantages of the invention will be more readily understood from the following discussion taken in conjunction with the accompanying drawings in which.

DETAILED DESCRIPTION

Figure 1:
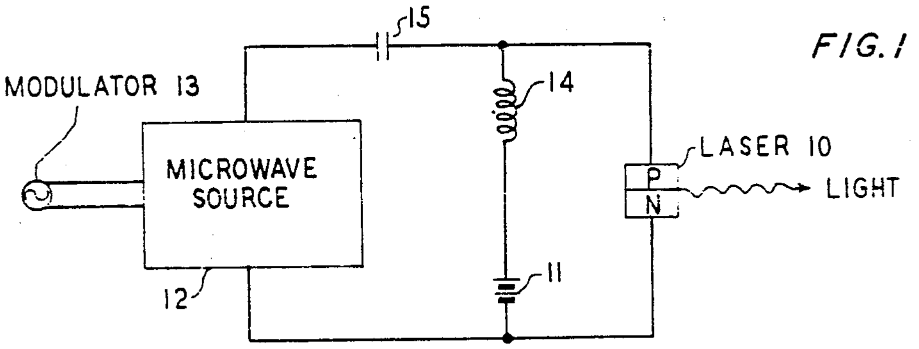
FIG. 1 is a schematic diagram of apparatus useful in modulating a PN junction laser in accordance with the invention.

FIG. 1 is a schematic diagram of apparatus useful in modulating a PN junction laser in accordance with the invention, comprising a PN junction laser 10 (including a cooling arrangement not shown) coupled to both a DC voltage source 11 and a low power microwave voltage source 12 including a modulator 13 for frequency modulating the microwave source according to input information. In a simple arrangement, the laser is in parallel to both the DC voltage source 11 in series with an inductor 14 and the microwave source 12 in series with a capacitor 15. The values of the inductance and capacitance of elements 14 and 15, respectively, are chosen to isolate the two voltage supplies from one another so that the total voltage drop across the laser is essentially equal to the sum of the voltages of the two sources.

The value of the DC voltage is chosen to produce self-induced pulsing in the output of the laser 10. This voltage typically depends on the particular laser and the temperature. For gallium arsenide junction lasers at liquid nitrogen temperatures, the voltage is typically that required to produce between 1.1 and 3 times the threshold current for lasing. The pulsing repetition rate is typically between 0.5 and 3 gigaHertz. The exact range of DC voltages producing pulsing for a particular laser can be determined empirically by varying the voltage, detecting the laser light with a photodiode and examining the diode output in a microwave spectrum analyzer. Once spontaneous pulsing is produced, the microwave voltage source 12 is set at a frequency approximately equal to the pulse repetition rate or a nearby harmonic thereof. At relatively small amounts of microwave power, typically less than a few milliwatts, the phase of the light pulses lock to that of the microwave source.

When the frequency of the microwave source is modulated, the repetition rate is pulled with it to at least 50 MHz. on either side of its locked value at rates in excess of 10 MHz. It is expected that rates as high as the pulsing frequency itself can be obtained with the proper microwave equipment. Thus a single modulated laser has at least the information carrying capacity of a coaxial cable.

The self-induced pulsing is attributed to coupling among the longitudinal modes of the laser and the high dispersion of semiconductor materials. Thus, theory indicates that similar pulsing behavior is present in semiconductor lasers made of materials other than gallium arsenide and/or using pumping mechanisms other than injection through a junction. The spiking repetition rate in such lasers can be modulated by analogous modulation of the pumping source. For example, in a semiconductor laser pumped by an electron beam, the modulated microwave signal is applied to the beam, and in an optically pumped laser, the intensity of the optical pumping source is modulated at microwave rates.

While nearly every junction laser tested exhibited spontaneous pulsing for some region of current and temperature, the invention will become clearer by reference to the following specific example.

EXAMPLE I

A gallium arsenide junction laser was fabricated in the following manner. An N-doped substrate was formed by growing a tellurium-doped crystal of gallium arsenide by the (zochralski method and slicing the crystal into wafers. The free electron concentration of the substrate was between 3 and $4.5\times 10^{18}$ electrons per cubic centimeter. A P-doped region was diffused into the substrate using the well-known box method. With a source comprising a 2.0 Percent solution of zinc in gallium saturated with gallium arsenide, the diffusion time was 4 hours at 800° C. The depth of the junction thus formed was about 1.8 microns.

The substrate was then heat treated. After a protective layer of about 950 angstroms of $SiO_2$ was applied, the substrate, along with a few milligrams of pure arsenic, was placed in a quartz ampul (having a volume of about 7 cubic centimeters). The ampul was evacuated to a pressure of $10^{17}$ mm. of mercury. The ampul was then heated 4 hours at 850° C. and quenched to 0° C. by immersion in ice water.

After the heat-treating step, the electrical contacts to the N- and P-regions of the diode were formed. Stripes having dimensions 25.4×380 microns were cut through the oxide on the P-doped region by photolithographic methods. A second diffusion was then carried out in order to make a good ohmic contact to the P-doped region. (This diffusion does not alter the original diffusion and is used only to make good contacts.) This step was carried out by the box method, using a pure zinc arsenide source and a diffusion time of 15 minutes at 650° C. This diffusion formed a heavily-doped layer in the P-region with a thickness of less than 3,000 angstroms. A metal contact comprising 500 angstroms of titanium, 5,000 angstroms of silver, and 1,000 angstroms of gold was then applied to the P-region. The N-doped side was lapped down to a thickness of about 105 microns and a contact comprising 2,000 angstroms of tin, 4,000 angstroms of nickel and 4,000 angstroms of gold was applied. The substrate was then scribed and cleaved to form individual Fabry-Perot cavities having final dimensions on the order of 100×38 ×625 microns.

The finished laser was then mounted on a copper heat sink in a microwave package having a window so that light from the laser can emerge. The package was inserted as the termination of a 50 ohm transmission line, designed in accordance with well-known microwave techniques to provide good coupling of external microwave signals into the laser.

Over certain ranges of injection current (between 1 and 2 times threshold) at heat sink temperatures between 77° K. and 110° K., the light intensity from the above laser consisted of spontaneously generated pulses at repetition rates between 500 MHz. and 1,200 MHz. For example, at a current of 670 ma. and a heat sink temperature of 96° K., pulses whose total width at the half-power point was approximately 400 psec. were generated at 620 Mhz. When locked by approximately 0.5 mw. of external microwave power at the pulse frequency, the pulse width was reduced to less than 200 psec. (this measurement being limited by the resolution of the detections system). Under these conditions, the maximum rate of pulse position modulation achieved thus far was greater than 10 MHz. and was limited only by the available microwave equipment.

Figure 2:
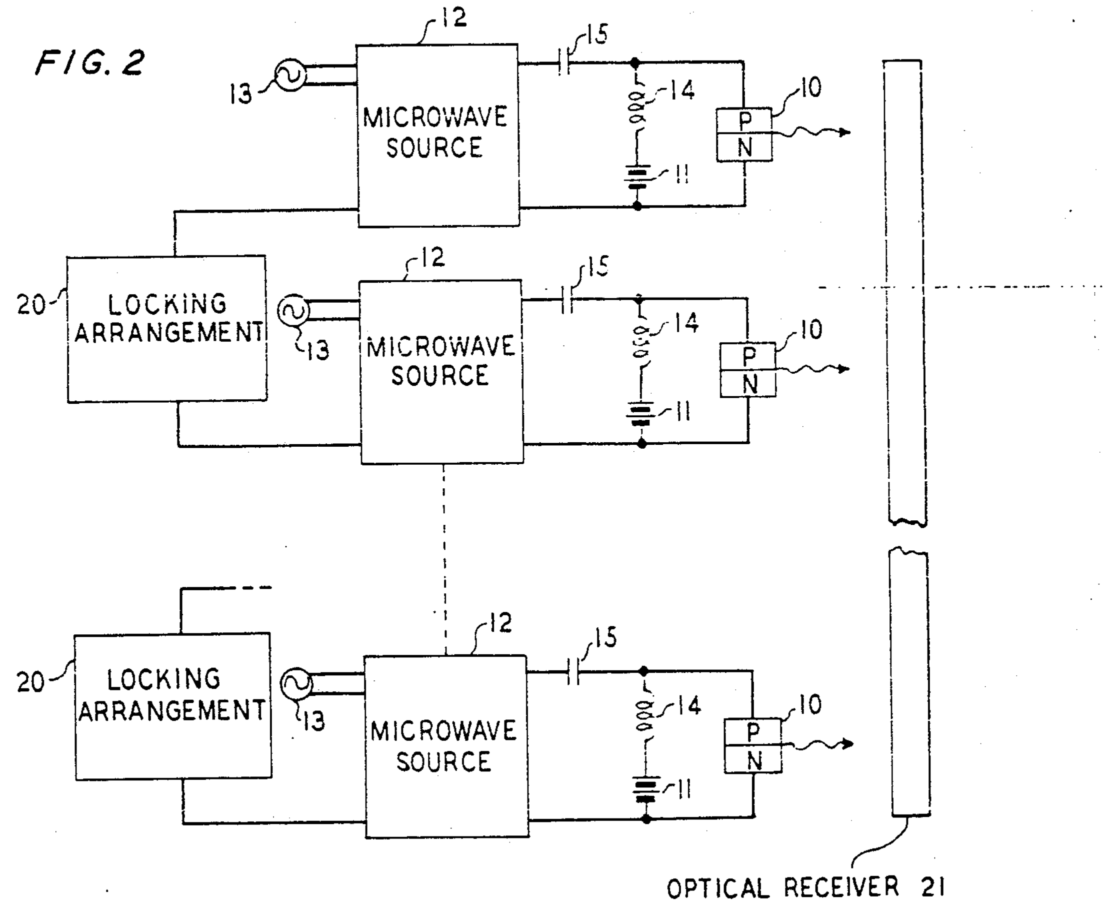
FIG. 2 is a schematic diagram of a multiplexed communications system using a plurality of lasers modulated in accordance with the invention.

FIG. 2 is a schematic diagram of a time multiplexed communications system using a plurality of lasers modulated in accordance with the invention. In this arrangement, a plurality of lasers 10 are locked at a common repetition rate. However, each laser is locked at a slightly different phase from each of the others by phase differential locking devices 20 coupling the microwave sources 12. The phase differences are chosen so that the modulated pulses do not overlap. At a pulse repetition rate of one gigaHertz and with maximum pulse widths of about 200 picoseconds, at least 5 channels can be multiplexed in this manner.

Receiver 21 is advantageously a very fast photodiode or an array of such diodes. Advantageously the diodes are P-I-N photodiodes or Schottky barrier photodiodes.

In addition to multiplexing in this manner, it is also clear that a second dimension of multiplexing can be introduced by using lasers having different frequencies of light. At the receiver the different frequencies can be separated by spectrographic techniques and the pulses detected by photodiodes.

What is claimed is:

1. A method for modulating a semiconductor laser comprising the steps of:

inducing spontaneous pulsing in the laser by the application of suitable pumping power;

phase locking the resulting pulse repetition rate by a low-power signal of pumping energy having a frequency approximately equal to the repetition rate of the spontaneous pulsing or a nearby harmonic thereof;

and modulating said locking signal in response to input information to modulate the repetition rate of said spontaneous pulsing.

2. The method according to claim 1 wherein said locking signal is frequency modulated.

3. The method according to claim 2 wherein:

said semiconductor laser is a PN junction laser;

said spontaneous pulsing is induced by the application of a DC voltage; and said phase locking of the pulsing repetition rate is produced by a microwave frequency voltage source.

4. The method according to claim 3 wherein said semiconductor laser is a gallium arsenide junction laser.

5. Apparatus for producing a modulated light signal comprising:

a PN junction laser;

means for applying a DC voltage to said laser of sufficient value to produce self-induced pulsing in the laser output;

means for applying a low-power microwave signal to said laser to lock the repetition rate of said pulses to the frequency of said microwave signal;

and means for modulating said microwave signal in accordance with an information-carrying signal.

6. A multiplexed communications system comprising:

a plurality of PN junction lasers;

means for applying DC voltage to each of said lasers to produce self-induced pulsing of each of said lasers at approximately the same repetition rate;

means for applying a low-power microwave signal to each of said lasers to lock the repetition rate of said pulses to substantially the same value;

and means for separately modulating the microwave signals applied to each of said lasers in accordance with an information-carrying signal;

means for introducing sufficient phase differences among the separately modulated lasers that the modulated pulses do not overlap; and means for receiving the light from said lasers.

7. A multiplexed communications system comprising:

a plurality of units of apparatus according to claim 5 the lasers comprising two or more groups emitting resolvably different frequencies of light; and means for receiving the light from said lasers.

UNITED STATES PATENT OFFICE
CERTIFICATE OF CORRECTION

Patent No. 3,614,447 Dated October 19, 1971

Inventor(s) Thomas L. Paoli and Jose' E. Ripper

It is certified that error appears in the above-identified patent and that said Letters Patent are hereby corrected as shown below:

Column 2, line 51, after "pressure of" delete "$10^{17}$" and insert --$10^{-7}$--.

Signed and sealed this 16th day of May 1972.

(SEAL)
Attest:

EDWARD M.FLETCHER,JR.
Attesting Officer

ROBERT GOTTSCHALK
Commissioner of Patents